(12) United States Patent
Kim et al.

(10) Patent No.: US 10,749,382 B2
(45) Date of Patent: Aug. 18, 2020

(54) WIRELESS POWER TRANSMITTER AND METHOD FOR OPERATING THE SAME BASED ON EXTERNAL VOLTAGE AND CURRENT

(71) Applicants: Samsung Electronics Co., Ltd., Suwon-si, Gyeonggi-do (KR); SEOUL NATIONAL UNIVERSITY R&DB FOUNDATION, Seoul (KR)

(72) Inventors: Ki-Young Kim, Yongin-si (KR); Eui-Hoon Chung, Seoul (KR); Jung-Ik Ha, Seoul (KR); Kang-Ho Byun, Yongin-si (KR); Ji-Hoon Jung, Seoul (KR)

(73) Assignees: Samsung Electronics Co., Ltd., Suwon-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 101 days.

(21) Appl. No.: 15/991,357

(22) Filed: May 29, 2018

(65) Prior Publication Data
US 2018/0366986 A1 Dec. 20, 2018

Related U.S. Application Data

(60) Provisional application No. 62/520,777, filed on Jun. 16, 2017.

(30) Foreign Application Priority Data

Nov. 17, 2017 (KR) .......................... 10-2017-0153770

(51) Int. Cl.
*H02J 50/12* (2016.01)
*H02J 7/02* (2016.01)
(Continued)

(52) U.S. Cl.
CPC .............. *H02J 50/12* (2016.02); *H02J 7/025* (2013.01); *H02J 50/10* (2016.02); *H02J 50/80* (2016.02);
(Continued)

(58) Field of Classification Search
CPC .. H02J 50/12; H02J 50/10; H02J 50/90; H02J 50/80; H02J 7/025; H02J 5/005;
(Continued)

(56) References Cited

U.S. PATENT DOCUMENTS

2014/0084701 A1* 3/2014 Bae .................... H02J 5/005
307/104
2016/0013662 A1 1/2016 Wakabayashi
(Continued)

FOREIGN PATENT DOCUMENTS

JP 2016021786 A 2/2016
KR 10-2017-0047482 A 5/2017

*Primary Examiner* — Richard Isla
*Assistant Examiner* — Manuel Hernandez
(74) *Attorney, Agent, or Firm* — Jefferson IP Law, LLP

(57) ABSTRACT

A wireless power transmitter is provided. The wireless power transmitter includes a power source configured to provide direct current (DC) power, an inverter configured to receive the DC power from the power source, invert the DC power into alternating current (AC) power, and output the AC power, a coil configured to generate a magnetic field based on an input of the AC power, a sensor configured to measure a voltage of the AC power output from the inverter and a current of the AC power output from the inverter, and at least one processor configured to identify an external voltage applied to a load of an electronic device based on the voltage of the AC power and the current of the AC power, wherein the electronic device is configured to be wirelessly charged using the magnetic field.

14 Claims, 12 Drawing Sheets

(51) Int. Cl.
*H02J 50/80* (2016.01)
*H02J 50/90* (2016.01)
*H02J 50/10* (2016.01)
*H04B 5/00* (2006.01)
*H02J 5/00* (2016.01)
*B60L 53/12* (2019.01)
*B60L 53/38* (2019.01)

(52) U.S. Cl.
CPC ............ *H02J 50/90* (2016.02); *B60L 53/12* (2019.02); *B60L 53/38* (2019.02); *H02J 5/005* (2013.01); *H04B 5/0075* (2013.01); *H04B 5/0093* (2013.01); *Y02T 90/122* (2013.01)

(58) Field of Classification Search
CPC ........ Y02T 90/122; B60L 53/38; B60L 53/12; H04B 5/0093; H04B 5/0075
USPC ........................................... 320/108; 307/104
See application file for complete search history.

(56) References Cited

U.S. PATENT DOCUMENTS

| | | | |
|---|---|---|---|
| 2016/0285316 A1* | 9/2016 | Zhang | H02J 50/80 |
| 2017/0033591 A1* | 2/2017 | Govindaraj | H02J 7/042 |
| 2018/0159382 A1* | 6/2018 | Lin | H02J 50/90 |
| 2019/0058357 A1* | 2/2019 | Du | H04B 5/0075 |
| 2019/0148979 A1* | 5/2019 | Goeldi | H02J 5/005 |

* cited by examiner

WIRELESS POWER TRANSMITTER AND METHOD FOR OPERATING THE SAME BASED ON EXTERNAL VOLTAGE AND CURRENT

CROSS-REFERENCE TO RELATED APPLICATION(S)

This application is based on and claims priority under 35 U.S.C. § 119(e) of a U.S. Provisional application Ser. No. 62/520,777, filed on Jun. 16, 2017, in the United States Patent and Trademark Office, and under 35 U.S.C. § 119(a) of a Korean patent application number 10-2017-0153770, filed on Nov. 17, 2017, in the Korean Intellectual Property Office, the disclosure of which is incorporated by reference herein in its entirety.

BACKGROUND

1. Field

The disclosure relates to wireless power transmitters and methods for operating the same. More particularly, the disclosure relates to wireless power transmitters capable of producing magnetic fields or electromagnetic waves to wirelessly charge electronic devices and methods for operating the same.

2. Description of Related Art

Portable digital communication devices have become must-have items for modern people. Customers desire to receive various high-quality services anytime, anywhere. Internet of thing (IoT) technology recently bundles various sensors, home appliances, and communication devices up into a single network. A diversity of sensors requires a wireless power transmission system for seamless operations.

Wireless power transmission may be performed in a magnetic induction, magnetic resonance, and electromagnetic wave scheme. The magnetic induction or magnetic resonance scheme is advantageous in charging electronic devices positioned within a relatively short distance from the wireless power transmitter. The electromagnetic wave scheme is more advantageous for remote power transmission that reaches a few meters as compared with the magnetic induction or magnetic resonance scheme. Such electromagnetic wave type is primarily intended for remote power transmission and may exactly grasp the location of remote power receivers and deliver power in a most efficient way.

Wireless power consortium (WPC) standards (or QI standards) and alliance for wireless power (A4WP) standards (or air fuel alliance (AFA) standards) have been prepared for magnetic induction schemes and resonance schemes, respectively. As per the WPC standards, an electronic device receiving power may perform in-band communication with a wireless power transmitter by an on/off keying modulation scheme. The A4WP standards require that electronic devices be equipped with a separate communication module (e.g., a bluetooth low energy (BLE) communication module) for out-band communication. Once charging starts, an electronic device may steadily report its internal sensing information (e.g., the magnitude of voltage, current, or power at, at least, one point in the electronic device) to a wireless power transmitter.

Following the WPC standards, the electronic device may experience variations in the magnitude of receive power as the switch connected to the dummy load turns on and off for on/off keying modulation and thus their wireless charging efficiency may degrade. Since the A4WP standards require that electronic devices come with a separate communication module. Thus, the electronic devices may end up consuming more power to drive the communication module, and this may slow down the charging speed. Furthermore, inclusion of the communication module may add an extra volume and weight to the electronic device to electronic devices which usually come in compact size. In particular, if the electronic device does not have a battery and is operated only with power wirelessly received, the wireless charging may be paused by the turn-off of the communication module.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a wireless power transmitter and method for operating the same.

Another aspect of the disclosure is to provide a wireless power transmitter capable of identifying at least one of the load voltage of an electronic device, which is being wirelessly charged, and mutual inductance even without receiving sensing information through a communication module and a method for operating the same.

Additional aspects will be set forth in part in the description which follows and, in part, will be apparent from the description, or may be learned by practice of the presented embodiments.

In accordance with an aspect of the disclosure, a wireless power transmitter is provided. The wireless power transmitter includes a power source configured to provide direct current (DC) power, an inverter configured to receive the DC power from the power source, invert the DC power into alternating current (AC) power, and output the AC power, a coil configured to generate a magnetic field using the AC power, a sensor configured to measure a voltage of the AC power output from the inverter and a current of the AC power output from the inverter, and at least one processor configured to identify an external voltage applied to a load of an electronic device based on the voltage of the AC power and the current of the AC power, wherein the electronic device is configured to be wirelessly charged using the magnetic field.

In accordance with another aspect of the disclosure, a method for operating a wireless power transmitter is provided. The method includes providing DC power from a power source, inverting the DC power into AC power and outputting the AC power, generating a magnetic field using the AC power through a coil, measuring a current of the AC power and a voltage of the AC power, and identifying an external voltage applied to a load of an electronic device based on the voltage of the AC power and the current of the AC power, wherein the electronic device is configured to be wirelessly charged using the magnetic field.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
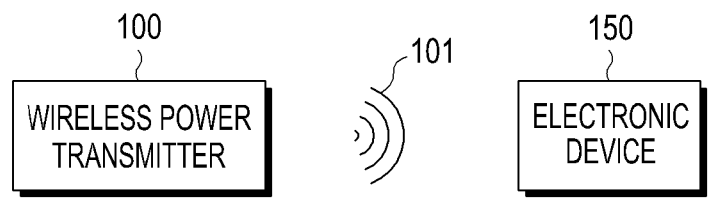
FIG. 1 is a block diagram illustrating a wireless power transmitter and an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural references unless the context clearly dictates otherwise. Thus, for example, reference to "a component surface" includes reference to one or more of such surfaces.

As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a central processing unit (CPU) or application processor) that may perform the operations by executing one or more software programs stored in a memory device or a dedicated processor (e.g., an embedded processor) for performing the operations.

For example, examples of the wireless power transmitter or electronic device according to embodiments of the disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the wireless power transmitter or electronic device may include at least one of a television, a set top box wiredly or wirelessly interworking with a television (TV), a digital video disk (DVD) player, an audio player, a refrigerator, an air conditioner, a cleaner, an oven, a microwave oven, a washer, a drier, an air cleaner, a set-top box, a home automation control panel, a security control panel, a media box, a gaming console, an electronic dictionary, an electronic key, a camcorder, an electric car, or an electronic picture frame.

According to an embodiment of the disclosure, the wireless power transmitter or the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to various embodiments of the disclosure, examples of the wireless power transmitter or electronic device may at least one of part of a piece of furniture, building/structure or vehicle, an electronic board, an electronic signature receiving device, a projector, or various measurement devices (e.g., devices for measuring water, electricity, gas, or electromagnetic waves). According to embodiments of the disclosure, the wireless power transmitter or electronic device may be flexible or may be a combination of the above-enumerated electronic devices. According to an embodiment of the disclosure, the wireless power transmitter or electronic device is not limited to the above-listed embodiments. As used herein, the term "user" may denote a human using the electronic device or another device (e.g., an artificial intelligent electronic device) using the wireless power transmitter or electronic device.

FIG. 1 is a block diagram illustrating a wireless power transmitter and an electronic device according to an embodiment of the disclosure.

Referring to FIG. 1, a wireless power transmitter 100 may wirelessly transmit power 101 to an electronic device 150. The wireless power transmitter 100 may transmit the power 101 to the electronic device 150 according to various charging schemes. For example, the wireless power transmitter 100 may transmit power 101 as per an induction scheme. Adopting the induction scheme, the wireless power transmitter 100 may include, e.g., a power source, a direct current (DC)-alternating current (AC) converting circuit, an amplifying circuit, an impedance matching circuit, at least one capacitor, and at least one coil. The at least one capacitor together with the at least one coil may constitute a resonance circuit. For example, the wireless power transmitter 100 may transmit power 101 as per a resonance scheme. Adopting the induction scheme, the wireless power transmitter 100 may include, e.g., a power source, a DC)AC converting circuit, an amplifying circuit, an impedance matching circuit, at least one capacitor, and at least one coil. The at least one capacitor and the at least one coil may constitute a resonance circuit. The wireless power transmitter 100 may include a coil that is capable of produce a magnetic field when letting an electric current flow thereacross by a resonance or induction scheme. The process of the wireless power transmitter 100 producing an induced magnetic field may be represented as the wireless power transmitter 100 wirelessly transmitting the power 101. Further, the electronic device 150 may include a coil that produces an induced electromotive force by the magnetic field generated around and varying in magnitude over time. The process of the electronic device 150 producing an induced electromotive force through the coil may be represented as the electronic device 150 wirelessly receiving the power 101. For example, the wireless power transmitter 100 may transmit power 101 as per an electromagnetic wave scheme. Adopting the electromagnetic scheme, the wireless power transmitter 100 may include, e.g., a power source, a DC-AC converting circuit, an amplifying circuit, a distributing circuit, a phase shifter, and a power transmission antenna array including a plurality of patch antennas. The plurality of patch antennas each may form a radio frequency (RF) wave (e.g., an electromagnetic wave). The electronic device 150 may include patch antennas capable of outputting electric current using RF waves generated around. The process of the wireless power transmitter 100 producing an RF wave may be represented as the wireless power transmitter 100 wirelessly transmitting the power 101. The process of the electronic device 150 outputting electric current from the patch antennas using RF waves may be represented as the electronic device 150 wirelessly receiving the power 101.

According to an embodiment, the wireless power transmitter 100 may measure a variation in load (or a variation in impedance) based on a variation in the magnitude of current, voltage, or power at the coil and determine at least one of voltage at, at least, one point in the electronic device 150 or mutual inductance between the wireless power transmitter 100 and the electronic device 150 using a result of the measurement. The wireless power transmitter 100 may adjust the magnitude of transmit power 101 based on the voltage at the, at least one, point in the electronic device 150. For example, upon determining that the load voltage of the electronic device 150 increases over a pre-designated value, the wireless power transmitter 100 may reduce the magnitude of transmit power 101 to prevent an over-voltage from being applied to the load of the electronic device 150. For example, upon determining that the load voltage of the electronic device 150 decreases under the pre-designated value, the wireless power transmitter 100 may increase the magnitude of transmit power 101 to prevent a low-voltage from being applied to the load of the electronic device 150. According to an embodiment, the wireless power transmitter 100 may adjust the magnitude of at least one of the voltage or current output from the power source or may adjust the magnitude of power 101 by adjusting the width of the current or voltage output from the inverting circuit.

As set forth herein, the "wireless power transmitter 100, the electronic device 150, or another electronic device performs a particular operation" may mean that various hardware devices, e.g., a control circuit, such as a processor, a coil, or a patch antenna, included in the wireless power transmitter 100, the electronic device 150, or the other electronic device performs the particular operation. The "wireless power transmitter 100, the electronic device 150, or another electronic device performs a particular operation" may also mean that the processor controls another hardware device to perform the particular operation. The "wireless power transmitter 100, the electronic device 150, or another electronic device performs a particular operation" may also mean that the processor or another hardware device triggers the particular operation as an instruction for performing the particular operation, which is stored in a storage circuit (e.g., a memory) of the wireless power transmitter 100, the electronic device 150, or the other electronic device, is executed.

Figure 2:
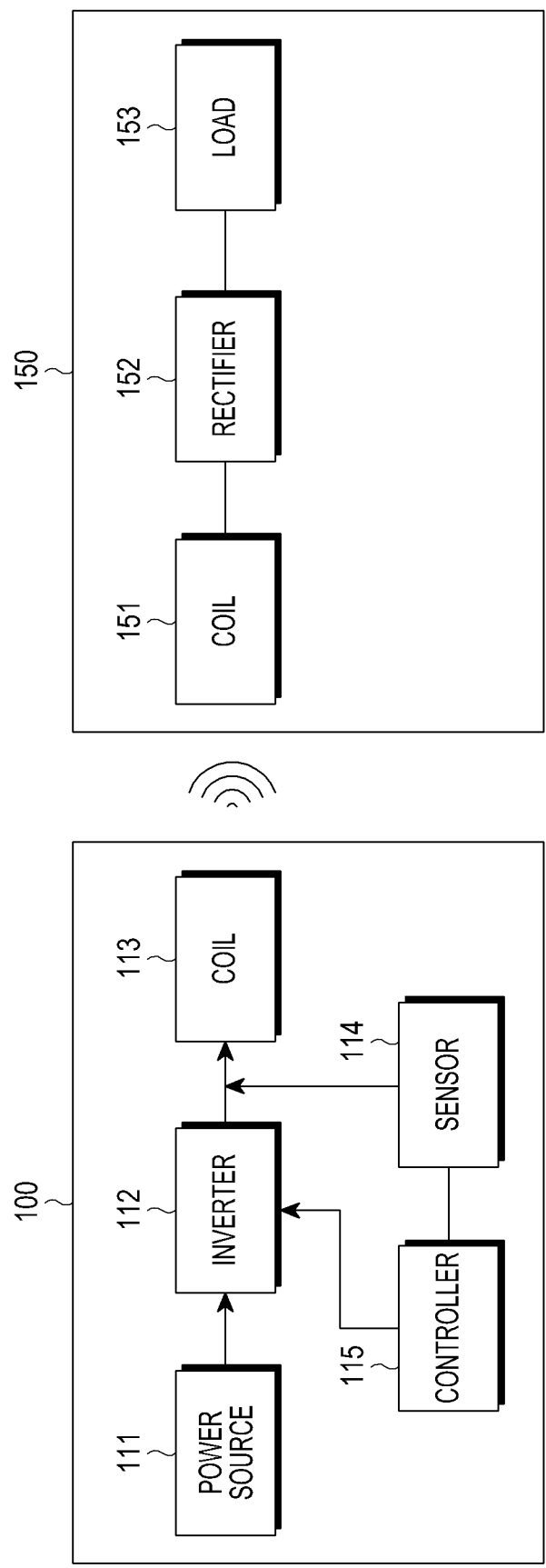
FIG. 2 is a block diagram illustrating a wireless power transmitter and an electronic device according to an embodiment of the disclosure.

FIG. 2 is a block diagram illustrating a wireless power transmitter and an electronic device according to an embodiment of the disclosure.

Referring to FIG. 2, a wireless power transmitter 100 may include a power source 111, an inverter 112, a coil 113, a sensor 114, and a controller 115. The electronic device 150 may include a coil 151, a rectifier 152, and a load 153. According to an embodiment, the wireless power transmitter 100 may wirelessly transmit power as per at least one of an induction scheme, a resonance scheme, or an electromagnetic wave scheme to the electronic device 150.

The controller 115 may control the magnitude of power that the wireless power transmitter 100 transmits. For example, the controller 115 may control the magnitude of power output from the power source 111 or control the gain of a power amplifier included between the power source 111 and the inverter 112 or between the inverter 112 and the coil 113, thereby controlling the magnitude of power that the wireless power transmitter 100 transmits. For example, the controller 115 may control the magnitude of the bias voltage of the power amplifier. The controller 115 may adjust the magnitude of power wirelessly transmitted from the wireless power transmitter 100 by controlling the duty cycle (or width) or frequency of power output from the inverter 112.

The controller 115 may be implemented in various circuits capable of performing calculation, such as a CPU or other general-purpose processors, a mini-computer, a microprocessor, a micro controlling unit (MCU), or a field programmable gate array (FPGA), but not limited in type thereto.

According to an embodiment, the coil 151 may wirelessly receive power as per at least one of an induction scheme, a resonance scheme, or an electromagnetic wave scheme from the coil 113. The rectifier 152 may rectify the received AC power into a DC waveform. Although not shown, a regulator (or DC/DC converter) may be added to regulate the rectified power output from the rectifier 152. The load 153 may mean an output terminal of the rectified power (or converted power) or various hardware components in the electronic device 150.

According to an embodiment, the sensor 114 may measure the magnitude of current input to the coil 113. The sensor 114 may measure the output voltage of the power source 111 or the output voltage of the inverter 112. The controller 115 may identify the voltage applied to the load 153 of the electronic device 150 that is being wirelessly charged, based on the magnitude of current input to the coil 113 and the output voltage of the inverter 112. The controller 115 may identify the mutual inductance between the electronic device 150 and the wireless power transmitter 110 based on the magnitude of current input to the coil 113 and the output voltage of the inverter 112. The controller 115 may adjust the magnitude of power wirelessly transmitted from the coil 113 based on at least one of the identified voltage applied to the load 153 or the mutual inductance. For example, upon determining that the voltage applied to the load 153 is higher than a pre-designated value, the wireless power transmitter 100 may reduce the magnitude of transmit power. Where the voltage applied to the load 153 is the same as the pre-designated value, the wireless power transmitter 100 may maintain the magnitude of transmit power. Where the voltage applied to the load 153 is lower than the pre-designated value, the wireless power transmitter 100 may increase the magnitude of transmit power. Upon determining that the magnitude of the mutual inductance is smaller than a designated value, the wireless power transmitter 100 may reduce the magnitude of transmit power and perform control so that the magnitude of the mutual inductance becomes the designated value or more.

According to an embodiment, the wireless power transmitter 100 and the electronic device 150 may include a module for in-band communication or out-band communication. In this case, the wireless power transmitter 100 may perform communication with the electronic device 150 during a subscription process. The wireless power transmitter 100 may receive identification information about the electronic device 150, rated voltage information, rated power information, information about the maximum magnitude of current or voltage permitted at the output end of the rectifier, and information about the capability of the electronic device 150. After receiving the information, the wireless power transmitter 100 may charge the electronic device 150. The electronic device 150 may sense at least one of voltage, current, power, or temperature at, at least, one point in the electronic device 150 while being charged and transmit the sensing data to the wireless power transmitter 100. According to an embodiment, the wireless power transmitter 100 may communicate with the electronic device 150 until charging begins, and once charging commences, the wireless power transmitter 100 may stop communication with the electronic device 150. Thereafter, as set forth above, the wireless power transmitter 100 may adjust the magnitude of transmit power by determining the load voltage of the electronic device 150 even without performing communication. Upon detecting a variation in the load voltage of the electronic device 150, the wireless power transmitter 100 may resume communication to receive sensing data from the electronic device 150.

According to an embodiment, the wireless power transmitter 100 may detect the electronic device based on a response to a ping-signal. The wireless power transmitter 100 may detect the electronic device based on a variation in load and the receipt of an advertisement signal. Where the electronic device 150 has a communication module, the wireless power transmitter 100 may receive sensing data from the electronic device 150 through the communication module after performing a subscription process. The user may desire to charge an electronic device 150 with no communication module. For example, the wireless power transmitter 100 may immediately carry out wireless charging by, e.g., designating an external button. As set forth above, in this case, the wireless power transmitter 100 may calculate the load voltage of the electronic device 150 that is being charged, based on the output voltage of the inverter and the current applied to the coil and control the magnitude of transmit power according to a result of the calculation.

Figure 3:
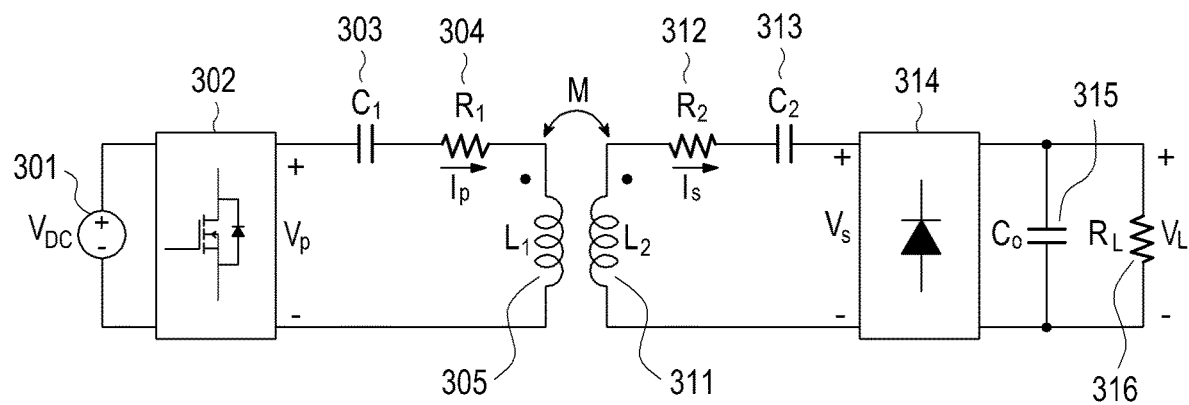
FIG. 3 is a circuit diagram illustrating a wireless power transmitter and an electronic device according to an embodiment of the disclosure.

FIG. 3 is a circuit diagram illustrating a wireless power transmitter and an electronic device according to an embodiment of the disclosure.

Figure 4:
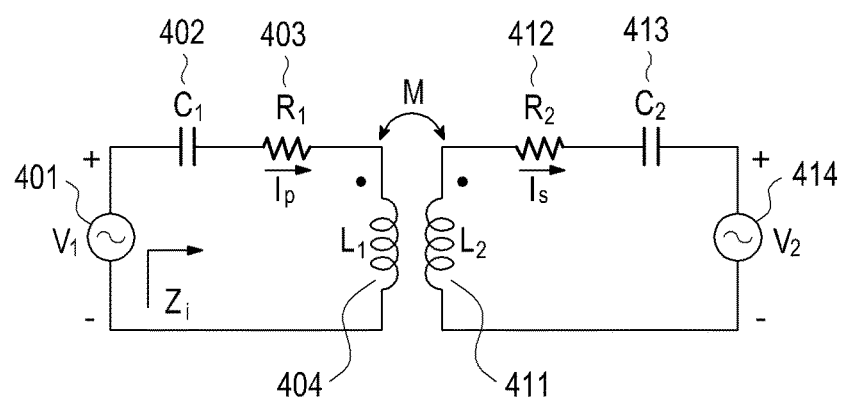
FIG. 4 is an equivalent circuit diagram of the circuit in FIG. 3 according to an embodiment of the disclosure.

FIG. 4 is an equivalent circuit diagram of the circuit in FIG. 3 according to an embodiment of the disclosure.

Referring to FIG. 3, the power source 301 may output a DC power, e.g., $V_{DC}$. The circuit diagram of FIG. 3 may be based on, e.g., series-series (SS) topology. The inverter 302 may invert the received DC power into AC power and output the AC power. The inverter 302 may be implemented as, but not limited to, a phase-shifted full-bridge inverter. The voltage of AC power output from the inverter 302 is denoted $V_p$. For example, $V_p$ may have a fixed frequency. The inverter 302 may adjust the magnitude of power delivered to the coil 305 by changing the duty cycle D, so that the magnitude of power wirelessly transmitted from the coil 305 may be adjusted. The capacitor 303 may be connected in series to the coil 305. The capacitor 303 may have a capacitance of $C_1$, and the coil 305 may have an inductance of $L_1$. Although it is illustrated that the capacitor 303 is connected in series to the coil 305, this is merely an example. Alternatively, the capacitor 303 may be connected in parallel with the coil 305. Or, the capacitor 303 may be connected in series to the coil 305 while another capacitor may be connected in parallel with the coil 305. The resistor 304 may mean the resistance of, e.g., the coil 305 or the wire and may have $R_1$ ohms. A first current $I_P$ may flow through the coil 305.

According to an embodiment, the coil 311 of the electronic device 150 may have an inductance of $L_2$. The mutual inductance between the coil 305 and the coil 311 may be M. The capacitor 313 may be connected in series to the coil 311. The capacitor 303 and the capacitor 313 may be connected in series with the coil 305 and the coil 311, respectively, for compensation, and such connections may be denoted SS compensation topology. The capacitor 313 may have a capacitance of $C_2$. Although it is illustrated that the capacitor 313 is connected in series to the coil 311, this is merely an example. Alternatively, the capacitor 313 may be connected in parallel with the coil 311. Or, the capacitor 313 may be connected in series to the coil 311 while another capacitor may be connected in parallel with the coil 311. The resonance frequency for wireless charging may be determined by Equation 1 below:

$$\omega_o = \frac{1}{\sqrt{L_1 C_1}} = \frac{1}{\sqrt{L_2 C_2}} \qquad \text{Equation 1}$$

The resistor 312 may mean the resistance of, e.g., the coil 311 or the wire and may have $R_2$ ohms. A second current $I_S$ may flow through the coil 311. Further, a voltage $V_S$ may be applied to the input terminal of the rectifier 313. The rectifier 314 may rectify AC power and output the rectified power. The rectifier 314 may be implemented as, e.g., a full-bridge diode rectifier. The load 316 may have a load value of RL. The load voltage applied to the load 316 may be $V_L$. The capacitor 315 may be connected in parallel with the load 316. The capacitor 315 may have a capacitance of $C_0$. Since a resonator is tuned to $\omega_0$, the secondary-side current, $I_S$, may influence the fundamental component. $I_S$ and $V_S$ may be in phase. Under the assumption that the primary power is transmitted by the fundamental component, the circuit diagram of FIG. 3 may be simplified as shown in FIG. 4. In this case, the inverter 302 of FIG. 3 may be simplified as a sinusoidal power source 401, and the voltage of the power source 401 may be expressed as $V_1$. The fundamental component of $V_p$ may be related with $V_1$ as expressed in Equation 2 below:

$$|V_1| = \frac{4V_{dc}}{\pi} \sin\left(\frac{\pi D}{2}\right) \qquad \text{Equation 2}$$

$V_{dc}$ may be the voltage of power output from the power source 301, and D may be the switching duty cycle of the inverter 302.

Referring to FIG. 4, a capacitor 402 may have the same capacitance $C_1$ as the capacitor 303 of FIG. 3, a resistor 403 may have the same resistance $R_1$ as the resistor 304 of FIG. 3, a coil 404 may have the same inductance $L_1$ as the coil 305 of FIG. 3, a coil 411 may have the same inductance $L_2$ as the coil 311, a resistor 412 may have the same resistance $R_2$ as resistor 312, and a capacitor 413 may have the same capacitance $C_2$ as capacitor 313. The rectifier 314 of FIG. 3 may be simplified as a sinusoidal voltage source 414, and the voltage of the voltage source 414 may be expressed as $V_2$. The fundamental component of $V_s$ of FIG. 3 may be related with $V_2$ as expressed in Equation 3 below:

$$|V_2| = \frac{4V_L}{\pi} \qquad \text{Equation 3}$$

According to an embodiment, the wireless power transmitter 100 may determine $V_2$ based on the current $I_p$ flowing through the coil 404 of the wireless power transmitter 100 and the output voltage $V_p$ of the inverter and may thus determine the load voltage $V_L$ of the electronic device 150 and the mutual inductance M. A constant voltage is required to be applied to the load 316 of the electronic device 150.

Where the load voltage $V_L$ (or $V_2$) varies, the wireless power transmitter 100 may catch the variation even though it has no communication module, and the wireless power transmitter 100 may accordingly adjust the magnitude of transmit power, allowing a constant voltage to be applied to the load 316. Where the alignment between the electronic device 150 and the wireless power transmitter 100 varies, the wireless power transmitter 100 may detect a variation in mutual inductance M. The wireless power transmitter 100 may adjust the magnitude of transmit power according to the variation in mutual inductance.

Referring to FIG. 4, the impedance viewed from the power source 401 may be denoted input impedance $Z_i$. The input impedance $Z_i$ may be expressed as shown in FIG. 4 below.

$$Z_i = \frac{V_1}{I_p} = \left[ \begin{array}{l} R_1 + \dfrac{\omega^2 M^2 \pi^2 (\pi^2 R_2 + 8R_L)}{(\pi^2 R_2 + 8R_L)^2 + \pi^4 X_2^2} + \\ j\left(X_1 - \dfrac{\omega^2 M^2 \pi^4 X_2}{(\pi^2 R_2 + 8R_L)^2 + \pi^4 X_2^2}\right) \end{array} \right] \qquad \text{Equation 4}$$

In equation 4, $\omega$, $X_1$, and $X_2$ may be the angular operation frequency, $(\omega L_1 - 1/(\omega C_1))$, and $(\omega L_2 - 1/(\omega C_2))$, respectively. As shown in FIG. 4, $Z_i$ may be a complex number with the real part and the imaginary part. The complex number may be expressed in the polar coordinate system as shown in Equation 5 below.

$$Z_i = |Z_i| \angle Z_i = |Z_i| \cos \angle Z_i + j|Z_i| \sin \angle Z_i \qquad \text{Equation 5}$$

In equation 5, $|Z_i|$ denotes the magnitude of $Z_i$, and $\angle Z_i$ denotes the phase angle of $Z_i$. Equations 4 and 5, $|Z_i|$ and $\angle Z_i$ may be expressed as shown in Equations 6 and 7 below.

$$|Z_i| = \sqrt{(R_1 + U(R_2 + R_L))^2 + (X_1 - UX_2)^2} \qquad \text{Equation 6}$$

$$\angle Z_i = \arctan\left[\frac{(X_1 - UX_2)}{R_1 + U(R_2 + R_L)}\right] \qquad \text{Equation 7}$$

In Equations 6 and 7, U may be expressed as $$U = \frac{\pi^2 \omega^2 M^2}{(\pi^2 R_2 + 8R_L)^2 + \pi^2 X_2^2}.$$

From Equations 6 and 7, the estimate $R_{L,est}$ for the load 316 may be calculated as shown in Equation 8 below.

$$R_{L,est} = \frac{\pi^2}{8}\left[\frac{X_2\left\{\begin{array}{l}|Z_i|^2 \tan\angle Z_i - R_1 X_1 (1 + (\tan\angle Z_i)^2) + \\ |Z_i|(X_1 - R_1 \tan\angle Z_i)\sqrt{1 + (\tan\angle Z_i)^2}\end{array}\right\}}{\{X_1^2(1 + (\tan\angle Z_i)^2) - |Z_i|^2(\tan\angle Z_i)^2\}} - R_2\right] \qquad \text{Equation 8}$$

Further, the estimate $M_{est}$ for the mutual inductance may be calculated as shown in Equation 9 below.

$$M_{est} = \frac{1}{\pi\omega}\sqrt{\frac{(X_1 - R_1 \tan\angle Z_i)((\pi^2 R_2 + 8R_{L,est})^2 + \pi^4 X_2^2)}{((\pi^2 R_2 + 8R_{L,est})\tan\angle Z_i + \pi^2 X_2)}} \qquad \text{Equation 9}$$

By the above-described method, the wireless power transmitter 100 may calculate the mutual inductance and may accordingly adjust the magnitude of transmit power.

The wireless power transmitter 100 may calculate the voltage $V_2$ of the source 414 of FIG. 4 as shown in Equation 10 below.

$$V_2 = \left[ \frac{\frac{\pi^2(R_1 X_2 + R_2 X_1) + 8R_L X_1}{8\omega M R_L} - }{j\left(\frac{\pi^2(\omega^2 M^2 + R_1 R_2 - X_1 X_2) + 8R_L R_1}{8\omega M R_L}\right)} \right]^{-1} V_1 \quad \text{Equation 10}$$

The wireless power transmitter 100 may calculate the estimate $V_{L,est}$ for the load voltage of FIG. 4 as shown in Equation 11 below.

$$V_{L,est} = \frac{8\omega M_{est} R_{L,est} V_{dc} \sin\left(\frac{\pi D}{2}\right)}{\pi^2 \sqrt{\frac{((R_1 X_2 + R_2 X_1) + 8R_{L,est} X_1)^2 +}{((\omega^2 M_{est}^2 + R_1 R_2 - X_1 X_2) + 8R_{L,est} R_1)^2}}} \quad \text{Equation 11}$$

The wireless power transmitter 100 may adjust or maintain the magnitude of transmit power based on the load voltage $V_L$ calculated through the above process.

As set forth above, the wireless power transmitter 100 may calculate the load voltage $V_L$ of the electronic device 150 and the mutual inductance form the current $I_p$ input from the coil 305 and the voltage $V_p$ at the output terminal of the inverter 302. A configuration for measuring the current $I_p$ is described below in greater detail with reference to FIGS. 7 and 8.

Figure 5:
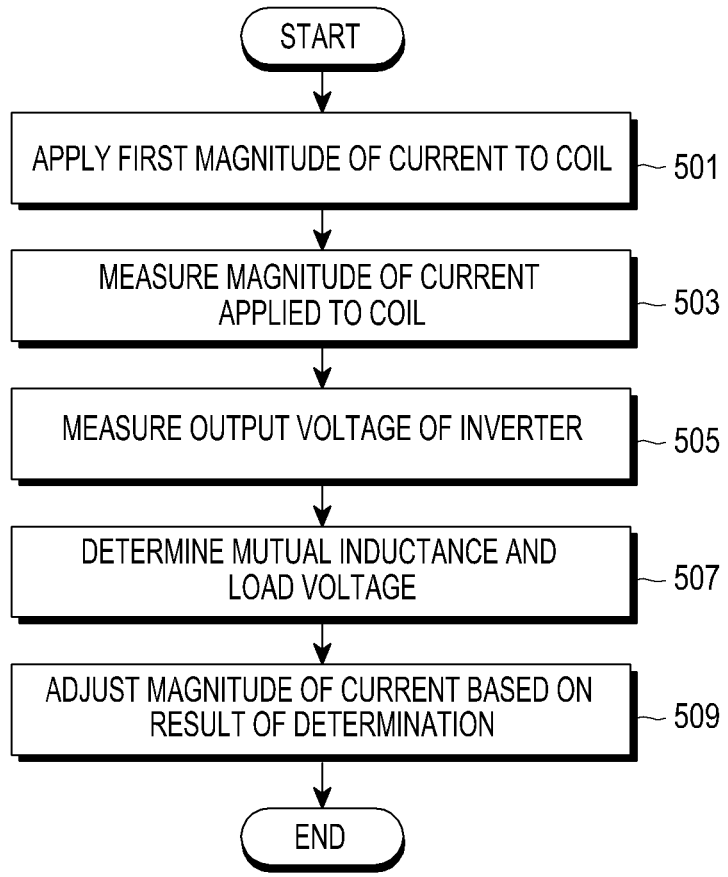
FIG. 5 is a flowchart illustrating a method for operating a wireless power transmitter according to an embodiment of the disclosure.

FIG. 5 is a flowchart illustrating a method for operating a wireless power transmitter according to an embodiment of the disclosure.

Referring to FIG. 5, the wireless power transmitter 100 may apply a first magnitude of current to a coil (e.g., the coil 305) in operation 501. In operation 503, the wireless power transmitter 100 may measure the magnitude of current applied to the coil (e.g., the coil 305). For example, the wireless power transmitter 100 may sample the current applied to the coil, at least, three times, and may measure the magnitude of the current applied to the coil (e.g., the coil 305). In operation 505, the wireless power transmitter 100 may measure the magnitude of output voltage of an inverter (e.g., the inverter 302). In operation 507, the wireless power transmitter 100 may determine the load voltage of the electronic device 150 and the mutual inductance based on the measured magnitude of current and the measured magnitude of voltage. In operation 509, the wireless power transmitter 100 may adjust the magnitude of current applied to the coil (e.g., the coil 305) based on a result of the determination.

Figure 6:
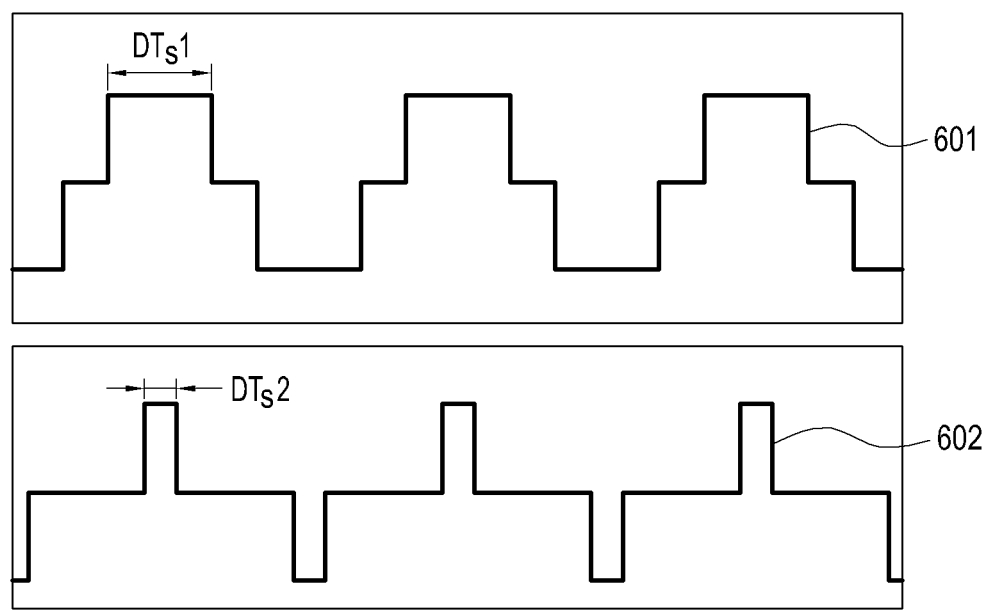
FIG. 6 is a view illustrating a waveform of an output voltage of an inverter according to an embodiment of the disclosure.

FIG. 6 is a view illustrating a waveform of an output voltage of an inverter according to an embodiment of the disclosure.

Referring to FIG. 6, the inverter 302 of the wireless power transmitter 100 may output a voltage 601 with a width of DTs1 as shown in FIG. 6. The wireless power transmitter 100 may identify that, e.g., the load voltage $V_L$ of the electronic device 150 is larger than a designated value. In other words, the wireless power transmitter 100 may identify that an over-voltage is applied to the load 316 of the electronic device 150. Accordingly, the wireless power transmitter 100 may determine to reduce the magnitude of transmit power. The wireless power transmitter 100 may decrease the width of the voltage 602 output from the inverter 302 to DTs2. As the width of the voltage 602 reduces, the magnitude of magnetic field produced from the coil 305 may decrease. An electromotive force induced by the magnetic field whose magnitude has been relatively reduced may be generated from the coil 311 of the electronic device 150. Hence, the voltage applied to the load 316 may be reduced as compared with the prior voltage, and an over-voltage may be prevented from being applied.

Figure 7:
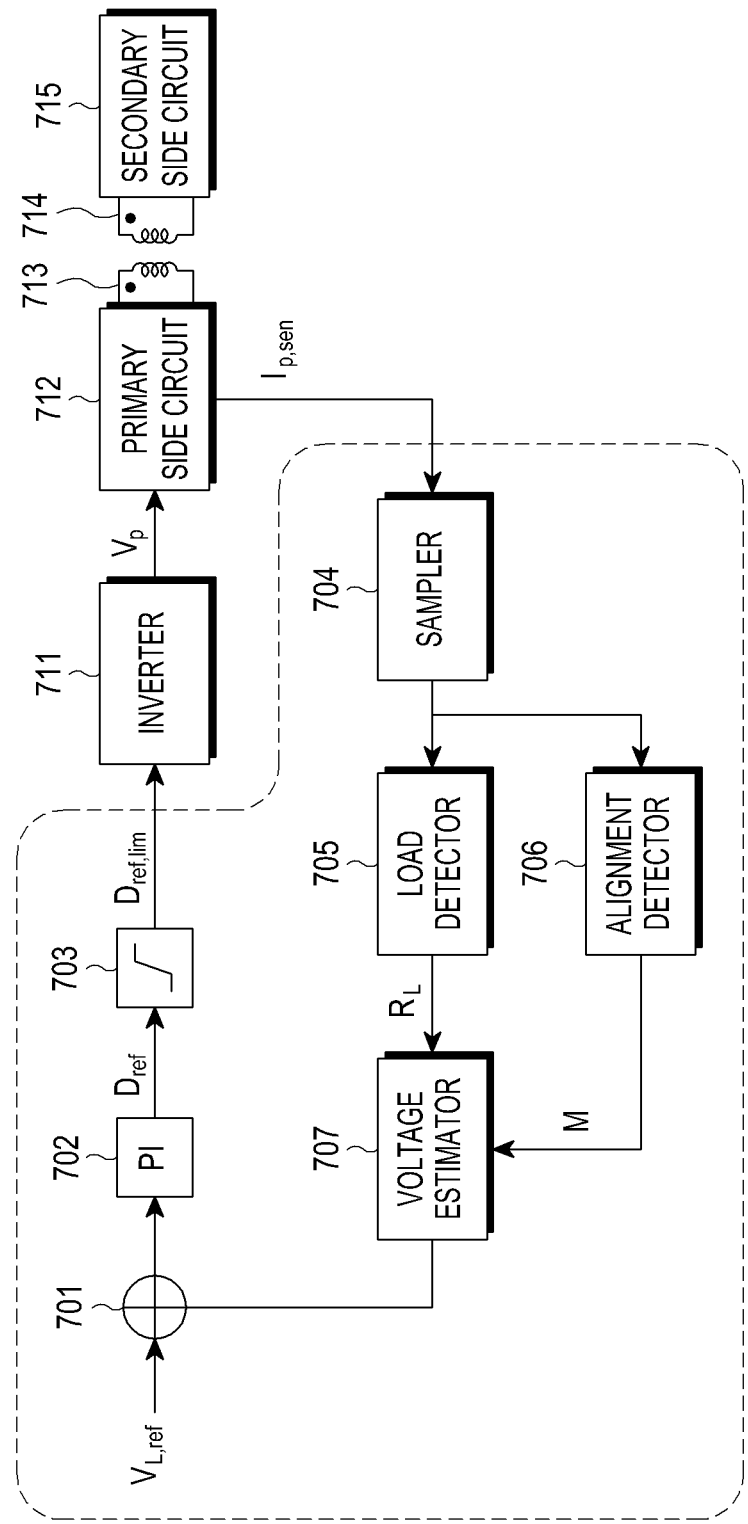
FIG. 7 is a block diagram illustrating a wireless power transmitter for measuring current according to an embodiment of the disclosure.

FIG. 7 is a block diagram illustrating a wireless power transmitter for measuring current according to an embodiment of the disclosure.

Referring to FIG. 7, the inverter 711 of the wireless power transmitter 100 may deliver power with a voltage of $V_p$ to the primary side circuit 712, and the coil 713 connected to the primary side circuit 712 may produce a magnetic field. An induced electromotive force may be generated from the coil 714 by the magnetic field and may be processed by the secondary side circuit 715. The sampler 704 may sample the current $I_{p,sen}$ of the primary side circuit 712 in a designated sampling cycle. According to an embodiment, the sampler 704 may sample the current $I_{p,sen}$ of the primary side circuit 712 three times. The load detector 705 may determine the load value of, e.g. resistance of $R_L$ of the load (e.g., the load 316) of the electronic device 150 using information about the current $I_{p,sen}$ measured by the sampler 704 and the output voltage $V_p$ of the inverter 711. For example, the load detector 705 may determine the resistance $R_L$ through the computation as expressed in Equation 8. The alignment detector 706 may determine the mutual inductance M between the electronic device 150 and the wireless power transmitter 100 using the output voltage $V_p$ of the inverter 711 and the information about the current $I_{p,sen}$ measured by the sampler 704. For example, the alignment detector 706 may determine the mutual inductance M through the computation as expressed in Equation 9. The voltage estimator 707 may calculate the estimator $V_{L,est}$ for the load voltage of the electronic device 150 using the resistance $R_L$ and the mutual inductance M. For example, the voltage estimator 707 may calculate the estimate $V_{L,est}$ for the load voltage through the computation as expressed in Equation 11. The proportional-integral (PI) controller 702 may receive a resultant signal obtained by summer 701 that sums the load voltage estimate $V_{L,est}$ calculated by the voltage estimator 707 and a reference load voltage $V_{L,ref}$. The PI controller 702 may output the duty cycle $D_{ref}$ based on a difference between the load voltage estimate $V_{L,est}$ and the reference load voltage $V_{L,ref}$. The duty cycle $D_{ref,lim}$ limited by the limiter 703 may be provided to the inverter. The inverter 711 may determine the duty cycle of the output voltage $V_p$ based on the limited duty cycle $D_{ref,lim}$.

Figure 8:
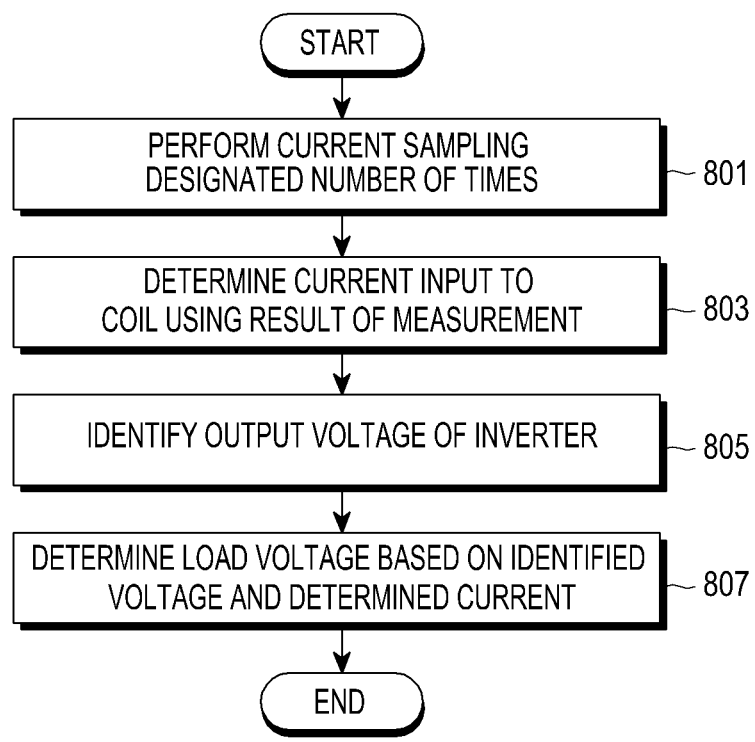
FIG. 8 is a flowchart illustrating a method for operating a wireless power transmitter according to an embodiment of the disclosure.

FIG. 8 is a flowchart illustrating a method for operating a wireless power transmitter according to an embodiment of the disclosure.

Referring to FIG. 8, the wireless power transmitter 100 may perform current sampling a designated number of times in operation 801. For example, the wireless power transmitter 100 may perform sampling three times. In operation 803, the wireless power transmitter 100 may determine the current $I_p$ input to the coil using a result of the measurement. The current $I_{p,sen}$ measured by the sensor may be expressed as shown in Equation 12 below.

$$I_{p,sen} = I_0 + |I_p|\sin(\theta + \delta) \quad \text{Equation 12}$$

$I_0$ may be the offset of the current $I_{p,sen}$, and $|I_p|$ may be the magnitude of the current $I_{p,sen}$. Where $V_1$ is expressed as $V_1 \sin \theta$, $\delta$ may be a phase angle difference between $V_1$ and $I_p$. To obtain the three unknown values $I_0$, $|I_p|$, and $\delta$, the wireless power transmitter 100 may perform sampling three times. The sampling frequency may be three times the switching frequency. The three unknown values $I_0$, $\delta$, and $|I_p|$ may be expressed as in Equations 13, 14, and 15, respectively.

$$I_0 = \frac{\sin\Delta\gamma_2(I_{p1}\cos\Delta\gamma_3 - I_{p3}) - \sin\Delta\gamma_3(I_{p1}\cos\Delta\gamma_2 - I_{p2})}{\sin\Delta\gamma_2(\cos\Delta\gamma_3 - 1) - \sin\Delta\gamma_3(\cos\Delta\gamma_2 - 1)} \quad \text{Equation 13}$$

$$\delta = \arctan\left(\frac{(I_{p1} - I_0)\sin\Delta\gamma_2}{(I_{p2} - I_0) - (I_{p3} - I_0)\cos\Delta\gamma_2}\right) - \gamma_1 \quad \text{Equation 14}$$

$$|I_p| = \frac{I_{p1} - I_0}{\sin(\gamma_1 + \delta)} \quad \text{Equation 15}$$

In Equations 13 to 15, $I_{pi}$ may be the magnitude of current measured where $\theta$ is $\gamma_1$, $\gamma_2$, and $\gamma_3$. $\Delta\gamma_2$ may be $\gamma_2$-$\gamma_1$, and $\gamma_3$ may be $\gamma_3$-$\gamma_1$. As set forth above, the wireless power transmitter 100 may calculate the current $I_p$ input to the coil by sampling a relatively small number of times. At operation 805, the wireless power transmitter 100 may determine the output voltage of the inverter. Further, the wireless power transmitter 100 may determine the load voltage $V_L$ of the electronic device 150 based on the output voltage $V_p$ of the inverter and the current $I_p$ input to the coil at operation 807.

FIGS. 9A, 9B, 10, 11, and 12 are graphs illustrating results of experiments according to various embodiments of the disclosure.

Figure 9A:
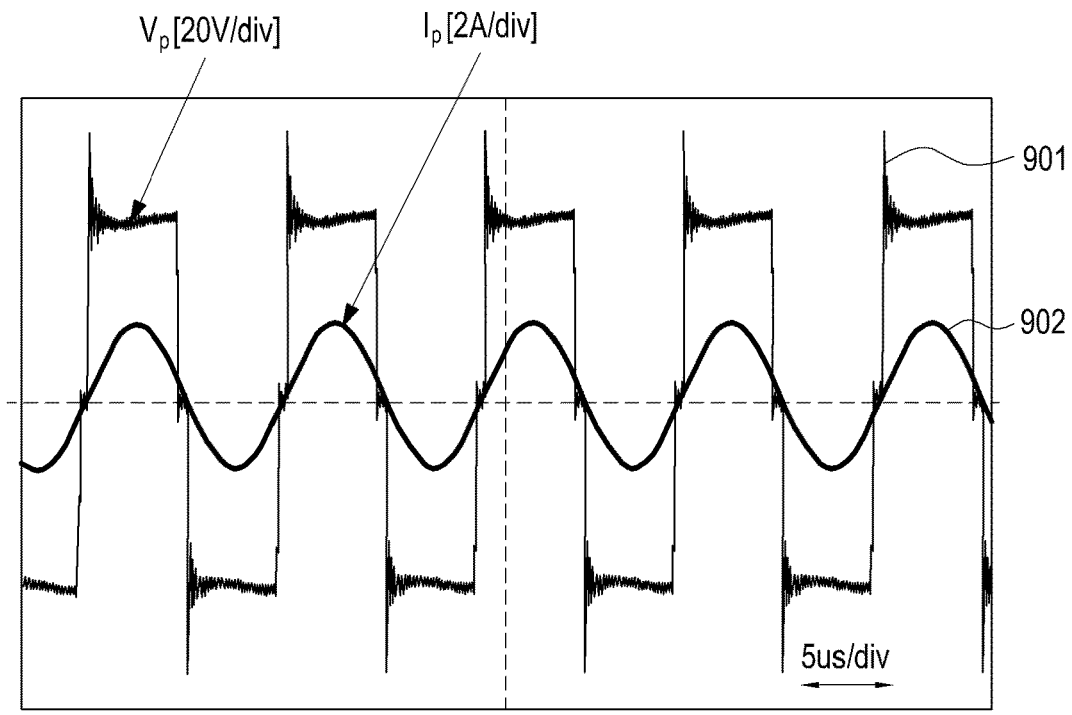
FIGS. 9A, 9B, 10, 11, and 12 are graphs illustrating results of experiments according to various embodiments of the disclosure.
Figure 9B:
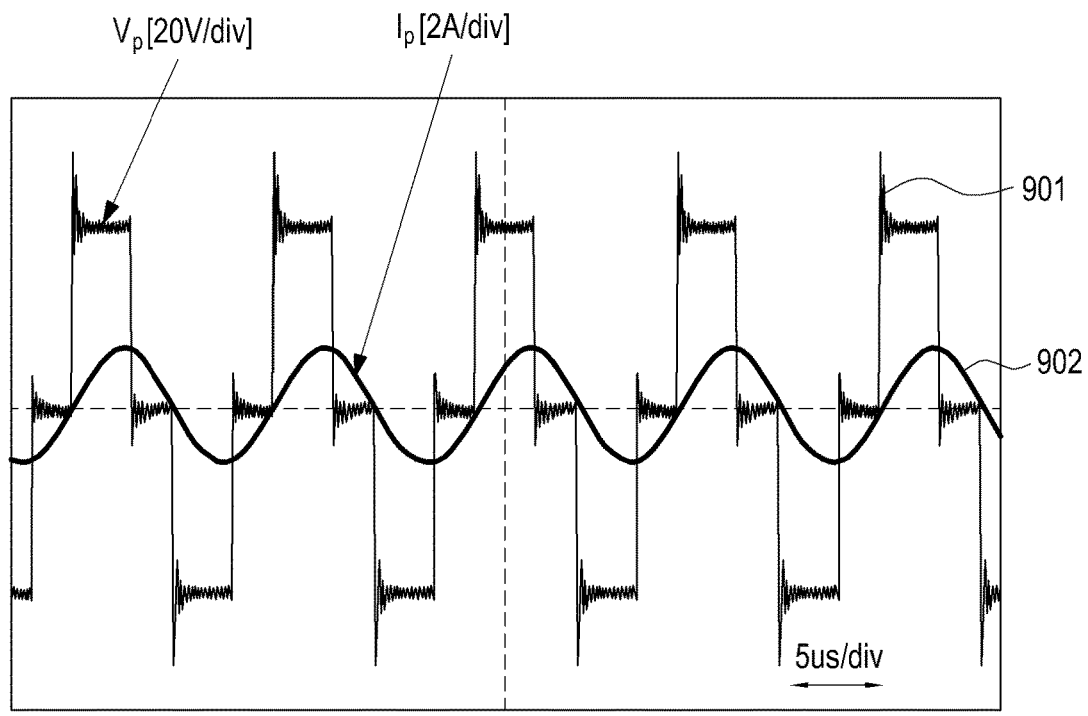

Referring to FIGS. 9A and 9B, that the voltage $V_p$ 901, which maintains a relatively constant magnitude, and the current $I_p$ 902, which maintains a relatively constant magnitude, may remain constant both at a load of 100% (e.g., when $R_L$ is 35Ω. The upper graph in FIG. 9) and a load of 50% (e.g., when $R_L$ is 35Ω).

Figure 10:
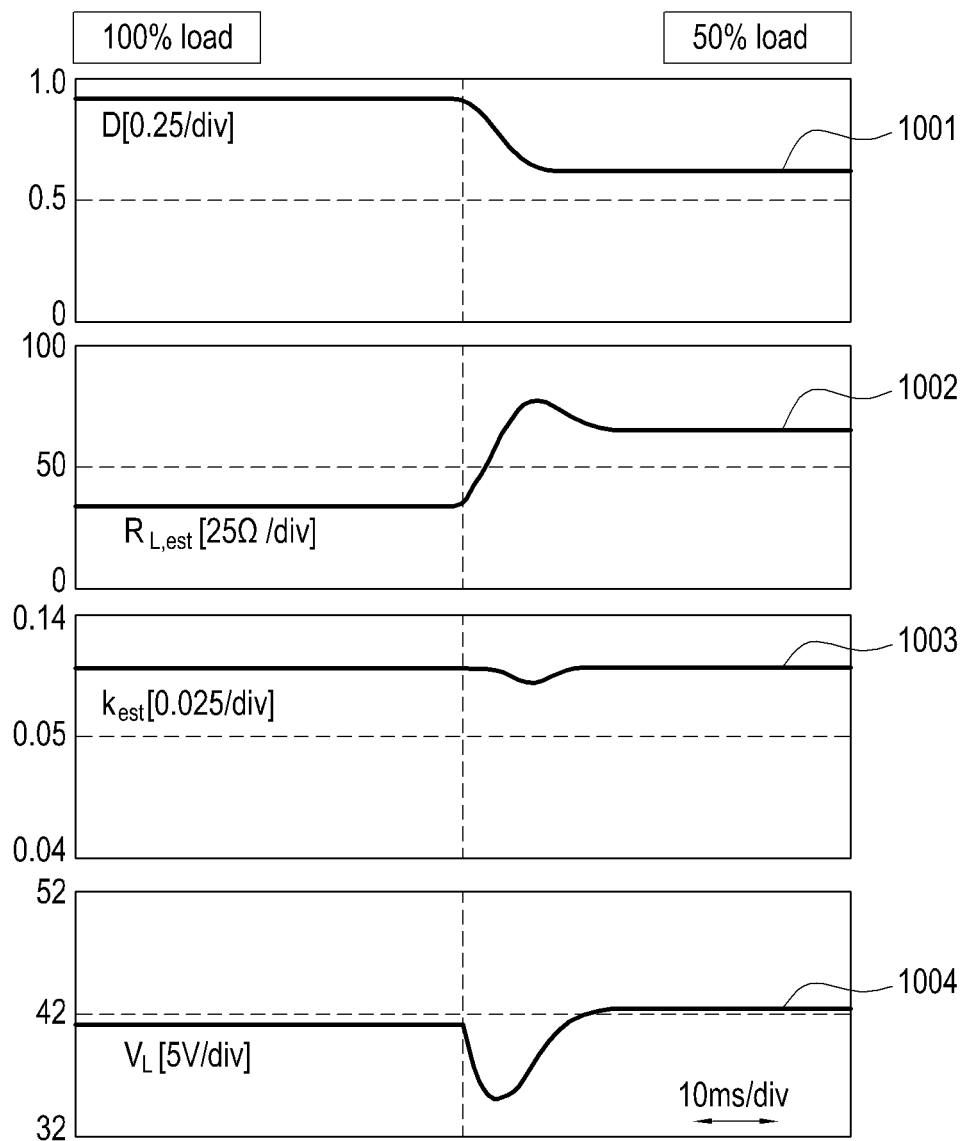

Referring to FIG. 10, the load resistance of the electronic device 150 varies from 100% to 50%. It can be seen from FIG. 10 that where the load resistance varies from 100% to 50%, the switching duty cycle D 1001 varies from a first value to a second value. It may also be shown that the load resistance estimate $R_{L,est}$ 1002 varies from a first value to a second value. In this case, it may be verified that the estimate $k_{est}$ 1003 for k associated with the mutual inductance M slightly varies around the time when the duty cycle D 1001 varies but mostly remains constant. It may be shown in this case that, although the load resistance varies from 100% to 50%, the actual load voltage 1004 of the electronic device remains constant.

Figure 11:
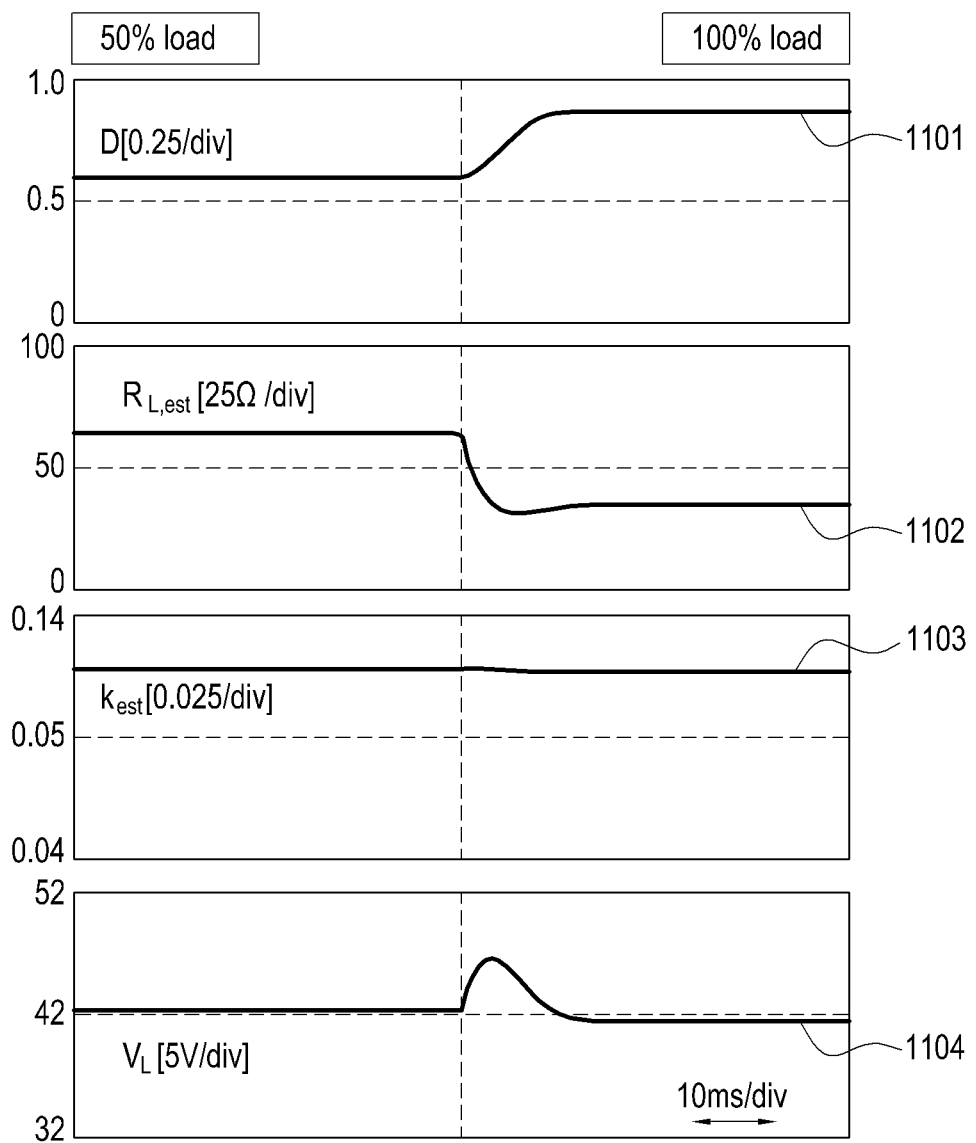

Referring to FIG. 11, the load resistance of the electronic device 150 varies from 50% to 100%. It can be verified from FIG. 11 that where the load resistance varies from 50% to 100%, the switching duty cycle D 1101 varies from a first value to a second value. It may also be shown that the load resistance estimate $R_{L,est}$ 1102 varies from a first value to a second value. In this case, it may be verified that the estimate $k_{est}$ 1103 for k associated with the mutual inductance M slightly varies around the time when the duty cycle D 1101 varies but mostly remains constant. It may be shown in this case that, although the load resistance varies from 50% to 100%, the actual load voltage 1104 of the electronic device remains constant.

Figure 12:
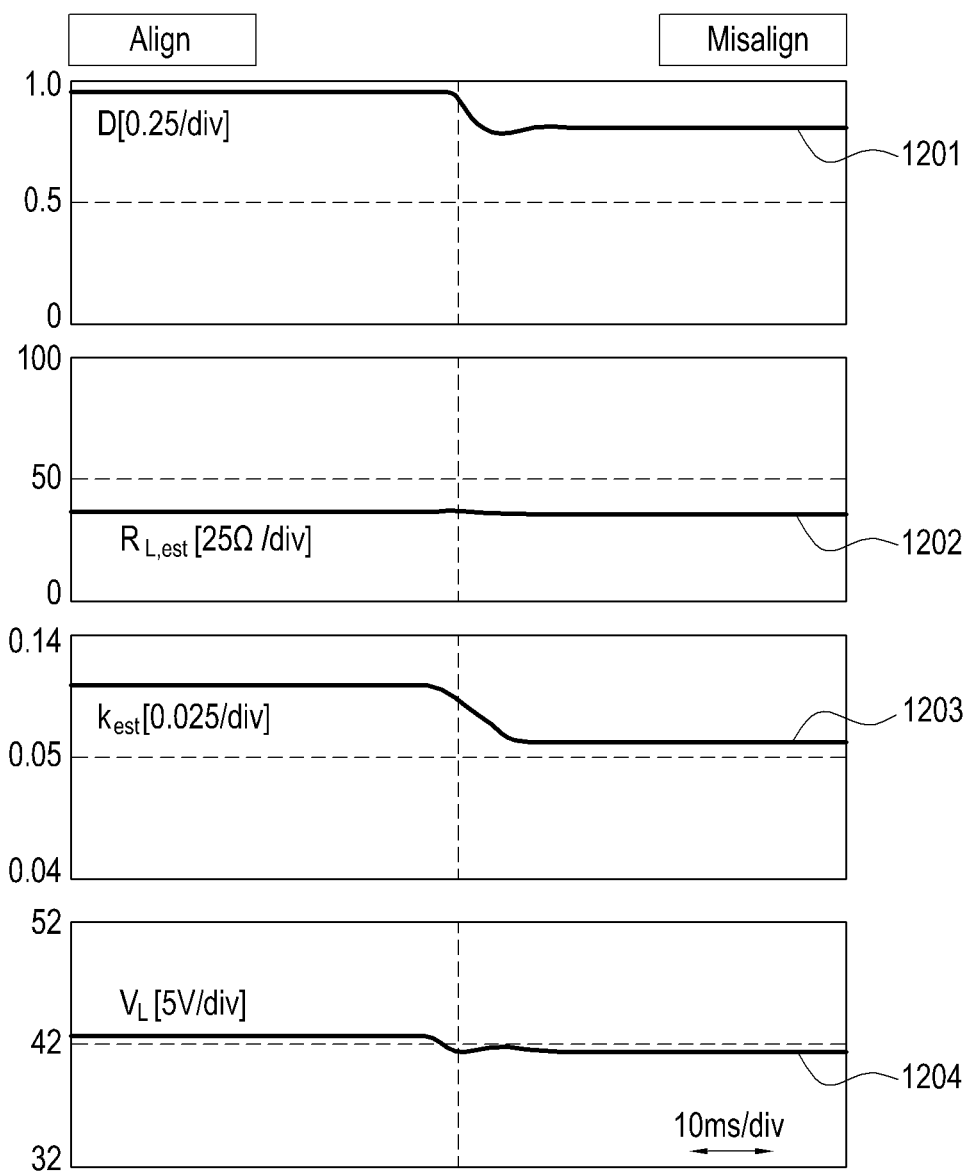

Referring to FIG. 12, the position of the electronic device 150 changes from aligned to misaligned with the wireless power transmitter 100. It can be verified from FIG. 12 that where the electronic device 150 is misaligned, the switching duty cycle D 1201 varies from a first value to a second value. It may also be verified that the load resistance estimate $R_{L,est}$ 1202, although subject to a tiny change around the time when the position changes, mostly remains constant. It may be shown in this case that the estimate $k_{est}$ 1203 for k associated with the mutual inductance M varies from a first value to a second value. It may be shown in this case that although the alignment of the electronic device 150 actually changes, the load voltage 1204 remains constant.

Figure 13:
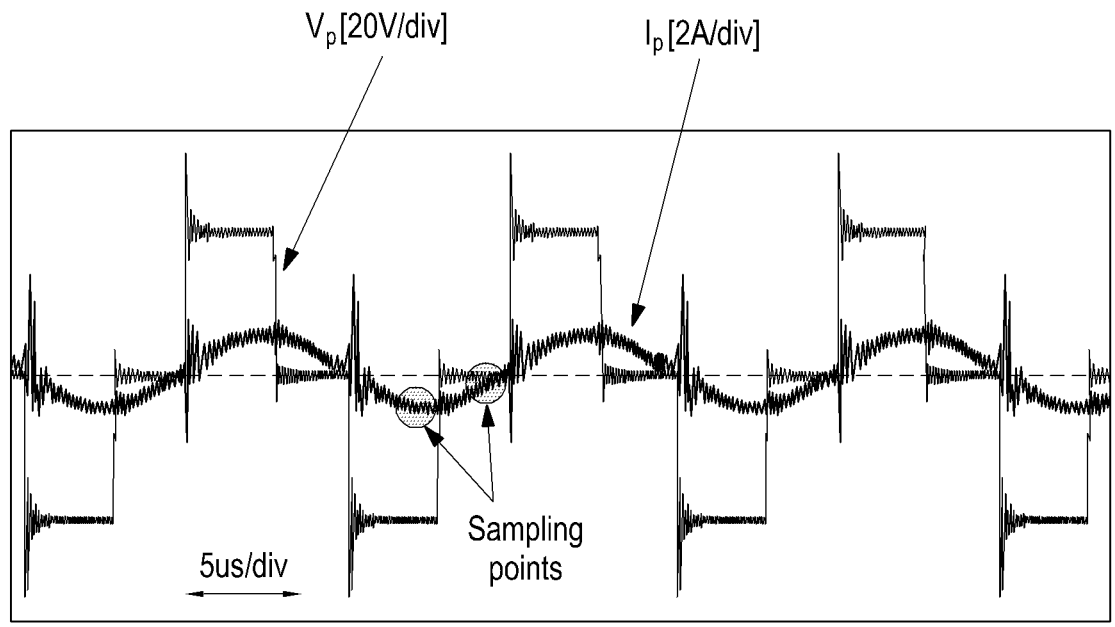
FIG. 13 is a view illustrating a sampling point according to an embodiment of the disclosure.

FIG. 13 is a view illustrating a sampling point according to an embodiment of the disclosure.

Referring to FIG. 13, the wireless power transmitter 100 may determine some points of a current input to the coil as sampling points, which may be determined to be points positioned right ahead of the switching points of the voltage $V_p$.

Figure 14:
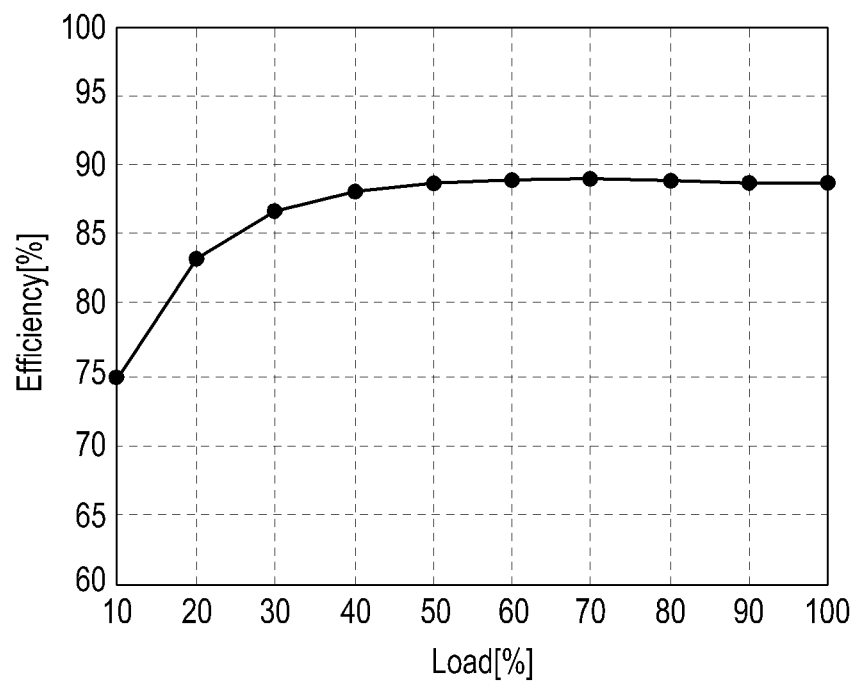
FIG. 14 is a view illustrating efficiency of a wireless power transmitter according to an embodiment of the disclosure.

FIG. 14 is a view illustrating efficiency of a wireless power transmitter according to an embodiment of the disclosure.

Referring to FIG. 14, where the load resistance of the electronic device 150 corresponds to a rated condition, it exhibits a high efficiency of about 89%.

Each of the aforementioned components of the wireless power transmitter or electronic device may include one or more parts, and a name of the part may vary with a type of the electronic device. The electronic device in accordance with various embodiments of the disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, FPGAs, or programmable logic arrays (PLAs) that perform some operations, which have already been known or will be developed in the future.

According to an embodiment of the disclosure, at least a part of the device (e.g., modules or their functions) or method (e.g., operations) may be implemented as instructions stored in a computer-readable storage medium e.g., in the form of a program module. The instructions, when executed by a processor, may cause the processor to carry out a corresponding function. The computer-readable storage medium may be e.g., the memory 130.

According to an embodiment, there may be provided a storage medium storing instructions that are executed by at least one processor to enable the at least one processor to perform at least one operation that may comprise providing DC power, inverting the DC power received from a power source into AC power and outputting the AC power, generating a magnetic field using the AC power through a coil of the wireless power transmitter, measuring a current of the AC power and a voltage of the AC power, and identifying a voltage applied to a load of an electronic device configured to be wirelessly charged using the magnetic field generated from the coil, based on the voltage of the AC power and the current of the AC power.

The above-described commands may be stored in an external server and may be downloaded and installed on an electronic device, such as a wireless power transmitter. In other words, according to an embodiment of the disclosure, the external server may store commands that are downloadable by the wireless power transmitter.

The computer-readable storage medium may include a hardware device, such as hard discs, floppy discs, and magnetic tapes (e.g., a magnetic tape), a read only memory (ROM), a random access memory (RAM) optical media such as compact disc ROMs (CD-ROMs) and digital versatile discs (DVDs), magneto-optical media such as floptical disks, flash memories, and/or the like. Examples of the program commands may include not only machine language codes but also high-level language codes which are executable by various computing means using an interpreter. The aforementioned hardware devices may be configured to operate as one or more software modules to carry out embodiments of the disclosure, and vice versa.

Modules or programming modules in accordance with various embodiments of the disclosure may include at least one or more of the aforementioned components, omit some of them, or further include other additional components. Operations performed by modules, programming modules or other components in accordance with various embodiments of the disclosure may be carried out sequentially, simultaneously, repeatedly, or heuristically. Furthermore, some of the operations may be performed in a different order, or omitted, or include other additional operation(s).

As is apparent from the foregoing description, according to various embodiments, there may be provided a wireless power transmitter capable of identifying at least one of the load voltage of an electronic device, which is being wirelessly charged, and mutual inductance even without receiving sensing information through a communication module and a method for operating the same. Therefore, there may be provided a wireless power transmitter capable of stably charging electronic devices even with no communication module.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A wireless power transmitter, comprising:
   a power source configured to provide direct current (DC) power;
   an inverter configured to receive the DC power from the power source, invert the DC power into alternating current (AC) power, and output the AC power;
   a coil configured to generate a magnetic field based on an input of the AC power;
   a sensor configured to measure a voltage of the AC power output from the inverter and a current of the AC power output from the inverter; and
   at least one processor configured to identify an external voltage applied to a load of an electronic device based on the voltage of the AC power and the current of the AC power,
   wherein the electronic device is configured to be wirelessly charged using the magnetic field,
   wherein the at least one processor is further configured to:
     sample, a designated number of times to create a first set of samples including three samples, the current of the AC power input into the coil,
     identify a phase angle difference between the current of the AC power input into the coil and the voltage of the AC power, an offset of the AC power, and a magnitude of the current of the AC power, based on the first set of samples, and
     identify the current of the AC power based on the phase angle difference, the offset of the AC power, and the magnitude of the current of the AC power, and
   wherein a sampling frequency at which the current of the AC power is sampled is three times a switching frequency of the inverter.

2. The wireless power transmitter of claim 1, wherein the at least one processor is further configured to decrease the magnitude of the AC power input into the coil when the external voltage is greater than a threshold value.

3. The wireless power transmitter of claim 1, wherein the at least one processor is further configured to increase the magnitude of the AC power input into the coil when the external voltage is less than a threshold value.

4. The wireless power transmitter of claim 1, wherein the at least one processor is further configured to maintain the magnitude of the AC power input into the coil when the external voltage corresponds to a threshold value.

5. The wireless power transmitter of claim 1, wherein the at least one processor is further configured to identify a mutual inductance between the wireless power transmitter and the electronic device based on the voltage of the AC power and the current of the AC power.

6. The wireless power transmitter of claim 5, wherein the at least one processor is further configured to adjust the magnitude of the AC power input into the coil so that the mutual inductance exceeds a threshold value.

7. The wireless power transmitter of claim 5, wherein the at least one processor is further configured to:
   identify a load value of the load of the electronic device based on the voltage of the AC power and the current of the AC power, and
   identify the external voltage using the mutual inductance and the load value of the load, based on the voltage of the AC power and the current of the AC power.

8. A method for operating a wireless power transmitter, the method comprising:
   providing DC power from a power source;
   inverting the DC power into AC power and outputting the AC power;
   generating a magnetic field by inputting the AC power into a coil;
   measuring a current of the AC power;
   measuring a voltage of the AC power; and
   identifying an external voltage applied to a load of an electronic device based on the voltage of the AC power and the current of the AC power,
   wherein the electronic device is configured to be wirelessly charged using the magnetic field,
   wherein measuring the current of the AC power comprises:

sampling, a designated number of times to create a first set of samples including three samples, the current of the AC power input into the coil, identifying a phase angle difference between the current of the AC power input into the coil and the voltage of the AC power, an offset of the AC power, and a magnitude of the current of the AC power, based on the first set of samples, and identifying the current of the AC power based on the phase angle difference, the offset of the AC power, and the magnitude of the current of the AC power, and wherein a sampling frequency at which the current of the AC power is sampled is three times a switching frequency of an inverter of the wireless power transmitter.

9. The method of claim 8, further comprising decreasing the magnitude of the AC power input into the coil when the external voltage is greater than a threshold value.

10. The method of claim 8, further comprising increasing the magnitude of the AC power input into the coil when the external voltage is less than a threshold value.

11. The method of claim 8, further comprising maintaining the magnitude of the AC power input into the coil when the external voltage corresponds to a threshold value.

12. The method of claim 8, wherein the identifying of the external voltage comprises identifying a mutual inductance between the wireless power transmitter and the electronic device based on the voltage of the AC power and the current of the AC power.

13. The method of claim 12, further comprising adjusting the magnitude of the AC power input into the coil so that the mutual inductance exceeds a threshold value.

14. The method of claim 12, wherein the identifying the external voltage comprises:

identifying a load value of the load of the electronic device based on the voltage of the AC power and the current of the AC power; and identifying the external voltage using the mutual inductance and the load value of the load, based on the voltage of the AC power and the current of the AC power.

* * * * *